(12) United States Patent
Yuen

(10) Patent No.: US 8,988,862 B2
(45) Date of Patent: Mar. 24, 2015

(54) PERFORMANCE DISPLAY DEVICE

(75) Inventor: Paul Anthony Yuen, Kwai Chung (HK)

(73) Assignee: Dayton Technologies Limited, Kwai Chung, New Territories (HK)

( * ) Notice: Subject to any disclaimer, the term of this patent is extended or adjusted under 35 U.S.C. 154(b) by 0 days.

(21) Appl. No.: 13/583,281

(22) PCT Filed: Mar. 9, 2011

(86) PCT No.: PCT/IB2011/050977
§ 371 (c)(1),
(2), (4) Date: Sep. 7, 2012

(87) PCT Pub. No.: WO2011/111000
PCT Pub. Date: Sep. 15, 2011

(65) Prior Publication Data
US 2013/0044099 A1 Feb. 21, 2013

(30) Foreign Application Priority Data
Mar. 9, 2010 (HK) .................. 10102488.3

(51) Int. Cl.
*H05K 5/00* (2006.01)
*H05K 7/00* (2006.01)
(Continued)

(52) U.S. Cl.
CPC ............ *A63B 71/0669* (2013.01); *B62J 99/00* (2013.01); *F16M 11/041* (2013.01); *F16M 11/06* (2013.01); *F16M 13/022* (2013.01); *A63B 69/16* (2013.01); *A63B 2220/17* (2013.01); *A63B 2220/20* (2013.01); *A63B 2220/30* (2013.01); *A63B 2220/833* (2013.01); *A63B 2225/20* (2013.01);
(Continued)

(58) Field of Classification Search
CPC ..... G06F 1/16; G06F 1/33225; H05K 5/0026; H05K 5/026; H05K 2201/10159
USPC ............. 361/679.01, 679.02, 679.08, 679.09, 361/679.3, 679.55–679.59; 345/156, 157, 345/168, 169; 312/223.1; 455/575.1
See application file for complete search history.

(56) References Cited

U.S. PATENT DOCUMENTS

| | | | | |
|---|---|---|---|---|
| 6,711,966 B2 * | 3/2004 | Chuang | ......................... | 74/551.8 |
| 7,815,474 B1 * | 10/2010 | Lin et al. | ........................ | 439/700 |
| 2008/0304221 A1 * | 12/2008 | Ueda | ............................ | 361/681 |

FOREIGN PATENT DOCUMENTS

| | | |
|---|---|---|
| CN | 2624272 | 7/2004 |
| CN | 101003295 | 7/2007 |

OTHER PUBLICATIONS

International Search Report for PCT/IB2011/050977 dated Jul. 14, 2011.

*Primary Examiner* — Jerry Wu
(74) *Attorney, Agent, or Firm* — Nixon Peabody LLP; Jeffrey L. Costellia

(57) ABSTRACT

A performance display device comprising a base receptacle and a display unit; wherein the display unit comprises a display screen and a processor, and is operable by a mode switch; the mode switch is operated by relative pivotal motion between the display unit and the base receptacle; characterized in that the display unit and the base receptacle are complementarily shaped to cooperatively form a hinge axis about which the mode changing pivotal motion takes place. A performance display device having a hinge axis formed by the complementarily shaped display unit and base receptacle provides a simple, robust, and reliable device.

19 Claims, 10 Drawing Sheets

(51) Int. Cl.
*G09G 5/00* (2006.01)
*G06F 3/02* (2006.01)
*A63B 71/06* (2006.01)
*B62J 99/00* (2009.01)
*F16M 11/04* (2006.01)
*F16M 11/06* (2006.01)
*F16M 13/02* (2006.01)
*A63B 69/16* (2006.01)

(52) U.S. Cl.
CPC .......... *A63B 2225/50* (2013.01); *A63B 2230/04* (2013.01); *A63B 2230/202* (2013.01); *A63B 2230/207* (2013.01); *A63B 2230/30* (2013.01); *A63B 2230/50* (2013.01); *B62J 2099/002* (2013.01); *B62J 2099/0033* (2013.01); *B62K 2207/00* (2013.01)
USPC ............. 361/679.02; 361/679.03; 361/679.06; 361/679.21; 361/679.29; 361/679.28; 361/679.27; 361/679.44; 345/156; 345/169

PERFORMANCE DISPLAY DEVICE

FIELD OF THE INVENTION

The present invention relates to performance display devices, and more particularly, to sports computers. More specifically, although not solely limited thereto, the present invention relates to bicycle computers.

BACKGROUND OF INVENTION

Performance display devices such as sports computers are useful for capturing and processing sporting data for subsequent display and feedback to a user. The processed data are then displayed on an information display screen for user reference so that a user can monitor past and present performance, and to devise strategies ahead. In addition to providing performance related data such as speed, distance, cadence, etc, modern day sports computers also include physiological monitoring means such as heart-rate monitors, blood oxygen level sensors, blood pressure monitors, etc, to monitor physical performance and conditions of a user to maintain a safe and healthy exercise routine.

More recently, performance display devices are increasingly equipped with telecommunications capabilities and are also configured to process ambient and/or environmental and/or weather data to provide useful information to assist users.

A performance display device is frequently used outdoors under high speed environments or when a high level of concentration is required, it is desirable that the display modes of a sports computer could be easily operable so that a user would not be distracted and lose control or balance while attempting to operate the performance display device when in motion.

US 2007/0170338 disclosed a sports computer having a toggle switching mechanism. However, the toggle switching mechanism is not mechanically efficient and the mechanical feedback to a user during activation of the toggle switch is not obvious enough for user detection or comfort.

SUMMARY OF INVENTION

According to the present invention, there is provided a performance display device comprising a base receptacle and a display unit; wherein the display unit comprises a display screen and a processor, and is operable by a mode switch; wherein the processor is arranged to process performance data, to cause showing of information on the display screen, and to change the mode of display when the mode switch is operated; wherein the mode switch is operated by relative pivotal motion between the display unit and the base receptacle; characterized in that the display unit and the base receptacle are complementarily shaped to cooperatively form a hinge axis about which the mode changing pivotal motion takes place.

A performance display device having a hinge axis for facilitating pivotal actuation motion between the display unit and the base receptacle which axis is formed by the complementarily shaped display unit and base receptacle provides a simple, robust, and reliable device because the axis is formed without additional moving parts joining the display unit and the base receptacle.

The base receptacle and the display unit may also be complementarily shaped to form a stop to limit the maximum allowable amplitude of the relative pivotal motion between the display unit and the base receptacle. Use of such complementary shaping to also form a stop to limit the amplitude of the switch actuation pivotal movement is advantageous because the stop could be integrally formed on the device with enhanced simplicity, robustness and reliability.

The guide arrangements on the base receptacle and on the display unit may be complementarily shaped and are arranged to restrict the display unit to slide along the axial direction when detaching from the base receptacle or when entering into engagement with the base receptacle. Further use of complementary shaping to also form guide arrangements to guide relative movement between the display unit and the base receptacle into or out of the mounting position is advantageous because the guide arrangements could be integrally formed on the device with enhanced simplicity, robustness and reliability.

The track of one track and rail arrangement may be tapered at a closed end to form a tapered track end, and the rail of another track and rail arrangement is tapered at an open end to form a tapered rail end; and wherein the tapered track end and the tapered rail end cooperate to form the hinge axis. Yet further use of complementary shaping to also form the hinge axis to facilitate pivotal switch actuation motion between the display unit and the base receptacle is particularly advantageous because the hinge axis could be integrally formed on the device with minimum moving parts, thereby achieving enhanced simplicity, robustness and reliability.

The tapered rail end is shaped as a blade edge and the tapered track end may be correspondingly shaped to receive the tapered rail end and to form a blade edged hinge when so received. A blade edged hinge axis is particularly advantageous for this application because of its better resilience, especially when there is no intermediate moving part to form the hinge.

The portion of the track on the display unit proximal the tapered track end may deflect towards the base receptacle, and the corresponding portion of the rail proximal the tapered rail end is correspondingly deflected. The deflection means the tapered track end is under minimal stress when in a switch neutral state when the moveable end of the display is elevated.

The moveable end of the display unit may be elevated by a portion of the base receptacle, and the deflection of the portion of the track on the display unit proximal the tapered track end and/or the deflection of the tapered rail end compensates or substantially compensates the inclination or tilting of the display unit due to the elevation of the moveable end of the display unit. This arrangement facilitates levelling of the display screen relatively to the floor of the base receptacle while providing pivotal actuation.

The deflection at the portion of the track on the display unit proximal the tapered track end may correspond to the maximum pivoting amplitude of the display unit relative to the base receptacle during pivotal actuation motion.

The display unit includes a hinged end and a moveable end, the moveable end being pivotally moveable about the hinge axis at a hinged end of the display unit; wherein the switch may be disposed to elevate the moveable end of the display unit above the base receptacle to allow pivotal motion of the moveable end of the display unit about the hinge axis.

The switch may be a push button switch having an actuation shaft, the actuation shaft being moveable between an extended state and a retracted state to change the switching status and being under spring urge to return to the extended state; wherein the moveable end of the display unit is elevated above the base receptacle by the actuation shaft.

A recess surrounding the actuation shaft may be formed on the bottom of the display unit and a complementarily shaped projection is formed at a corresponding location on the base receptacle, wherein the projection is arranged to elevate the moveable end of the display unit above a floor of the base receptacle through contact with the actuation shaft and the recess is provided to permit pivotal movement of the display unit towards the floor of the base receptacle.

BRIEF DESCRIPTION OF DRAWINGS

Embodiments of the present invention will be explained by way of non-limiting example with reference to the accompanying drawings, in which.

DETAILED DESCRIPTION OF EMBODIMENTS

Figure 1:
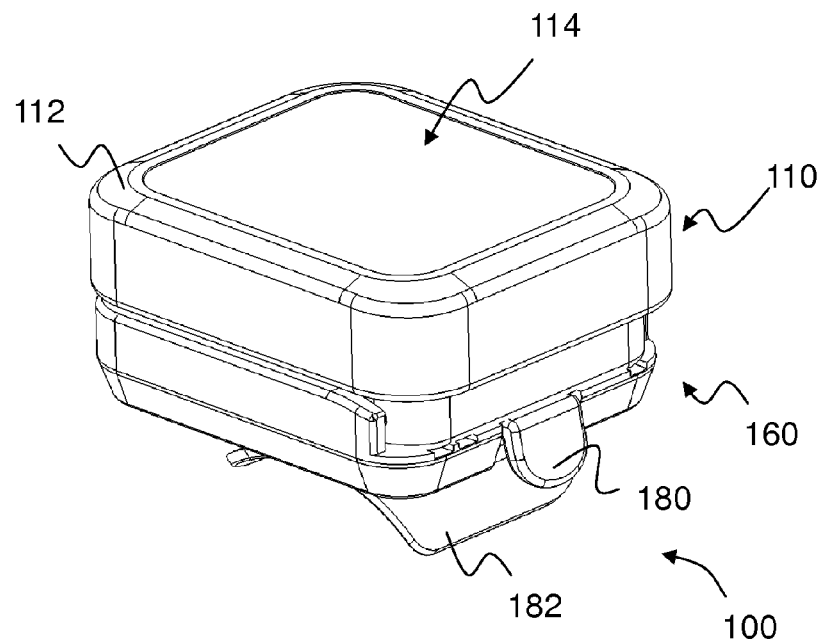
FIG. 1 is a top perspective view of a bicycle computer illustrating a first embodiment of a performance monitoring device according to the present invention.
Figure 2:
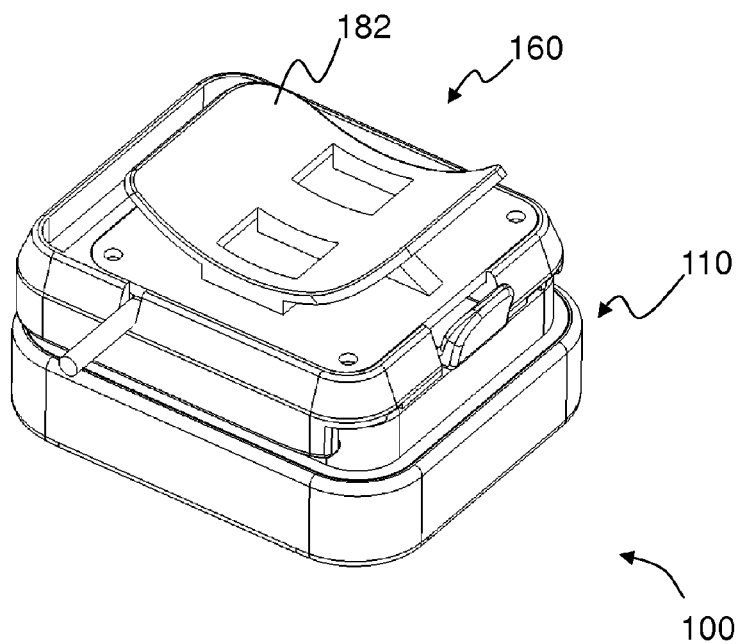
FIGS. 2 to 4 are respectively a bottom perspective view, a front view, and a side view of the bicycle computer of FIG. 1, FIGS. 5 and 5A are respectively a top and bottom perspective views of the bicycle computer of FIG. 1 when the processor module is detached from the mounting base.
Figure 3:
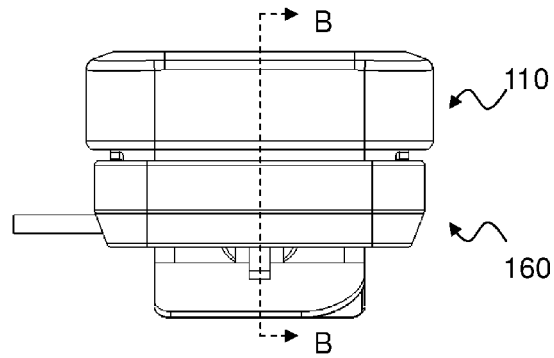
Figure 4:
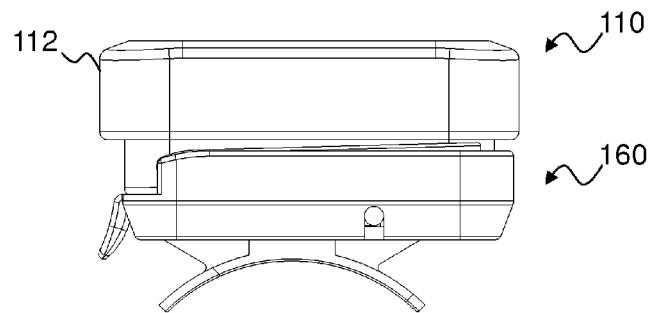

The bicycle computer 100 of FIGS. 1 to 10 as a first example of a performance display device comprises a processor module 110 as an example of a display unit and a mounting base 160 as an example of a base receptacle. The processor module 110 is detachably mounted on the mounting base and is arranged such that one longitudinal end (the moveable end) of the processor module 110 is pivotally moveable about another longitudinal end (the hinged end) of the processor module 110, and that a pivotal motion cycle undergo by the processor unit relative to the mounting base 160 will cause a change of information on display.

The processor module 110 comprises a moulded plastic main housing 112, a liquid crystal display (LCD) screen 114, a microprocessor or a microcontroller 116 as an example of a data processor, peripheral circuitry and an actuation switch 118. The main housing defines a sealed enclosure having a top portion, a bottom portion and a peripheral portion interconnecting the top and bottom portions. The top portion of the main housing is moulded into a substantially rectangular window with rounded corners and mounted with a transparent screen 120 of polycarbonate so that the LCD display inside the housing is visible from above. The bottom portion of the main housing comprises a tooth 122 adapted for cooperating with a complementarily shape indentation on the base receptacle for latching the display unit in position, a lidded battery compartment 124 arranged for receiving a battery for supplying operation power to the electronics of the processor module, defines an aperture through which the actuation shaft of the actuation protrudes, and further defines a recess around the aperture. The lidded battery compartment is sized to receive a CR 2032 lithium battery for a good energy to compactness ratio. The processor module 110 is mini pocket sized or cookie sized measuring about 4 cm (length) by 3.5 cm (width) and 1.5 cm (depth). In addition to the mode switching switch 118, a plurality of contact switches 152 for setting time or other operation modes, and a plurality of data entry parts 154 for receiving performance data from external sensors are also disposed on the undersides of the processor module.

Figure 6:
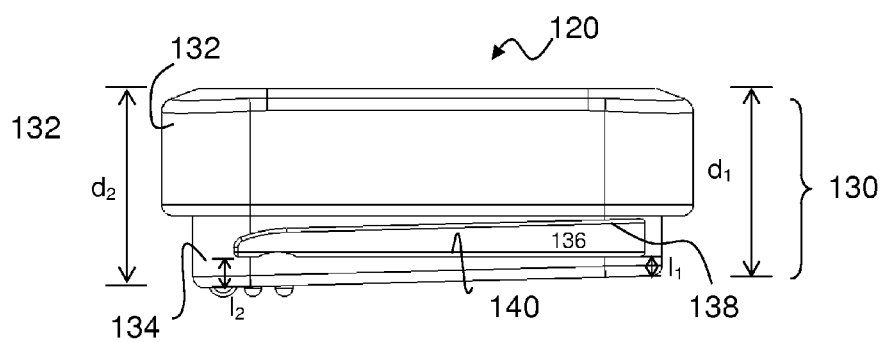
FIG. 6 is a side view of the processor module of the bicycle computer of FIG. 1.
Figure 7:
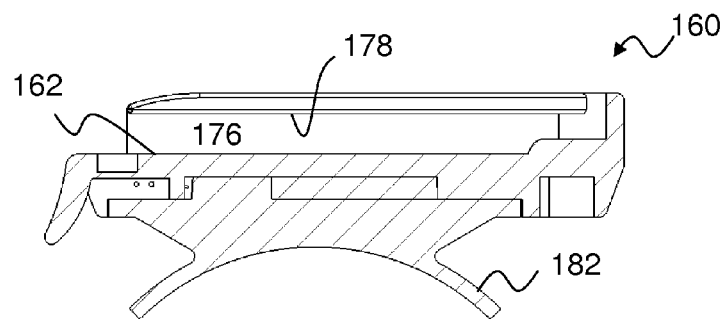
FIG. 7 is a longitudinal cross sectional view of the mounting base taken along line A-A of FIG. 4.
Figure 8:
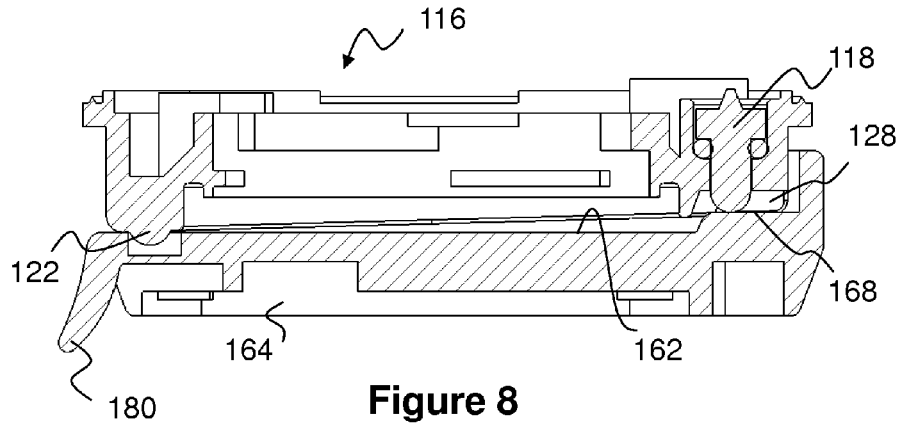
FIG. 8 is a longitudinal cross sectional view of the bicycle computer of FIG. 1 taken along line B-B of FIG. 3.
Figure 9:
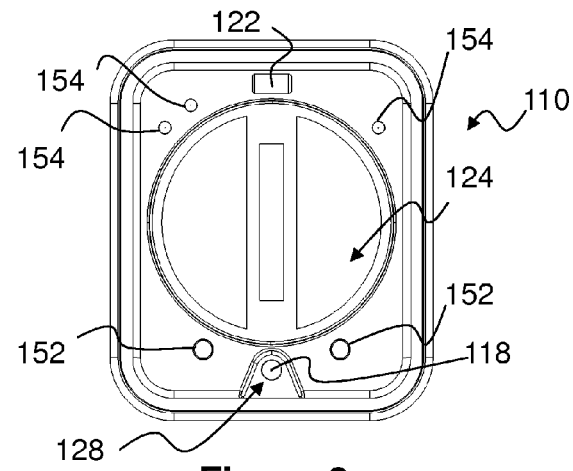
FIG. 9 is a bottom plan view of the processor module of the bicycle computer of FIG. 1.
Figure 10:
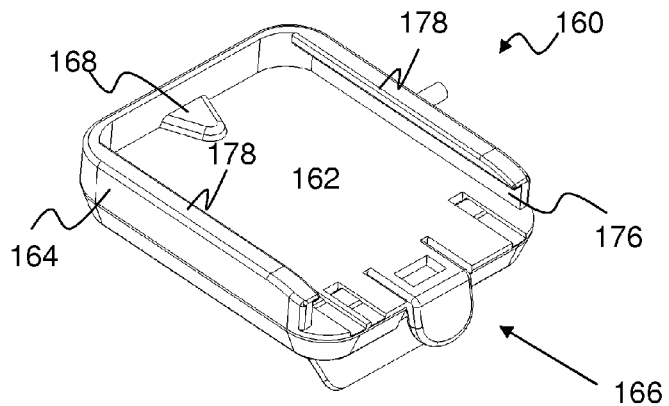
FIG. 10 is a top perspective view of the mounting base of the bicycle computer of FIG. 1 viewing from the receptacle entry end.
Figure 11:
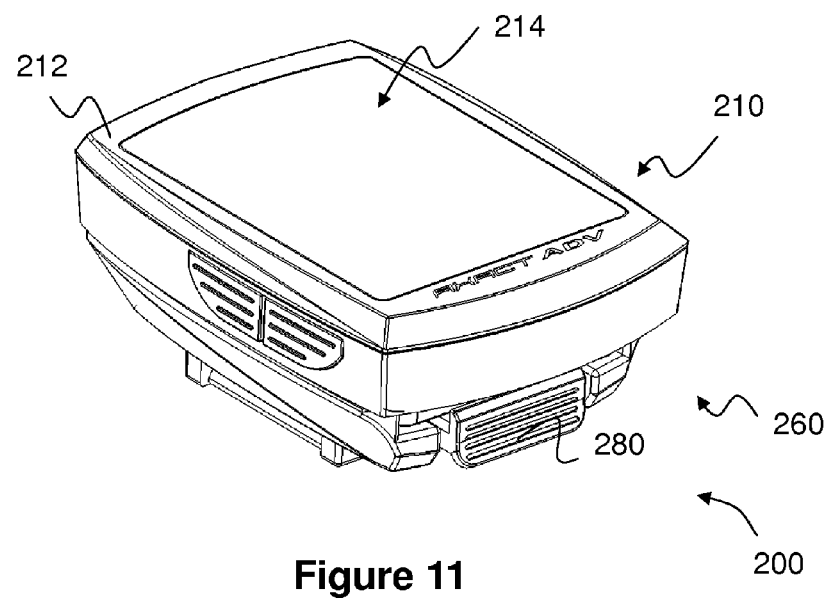
FIGS. 11-20 are views corresponding to FIGS. 1-10, but with reference to a second embodiment of a bicycle computer.
Figure 12:
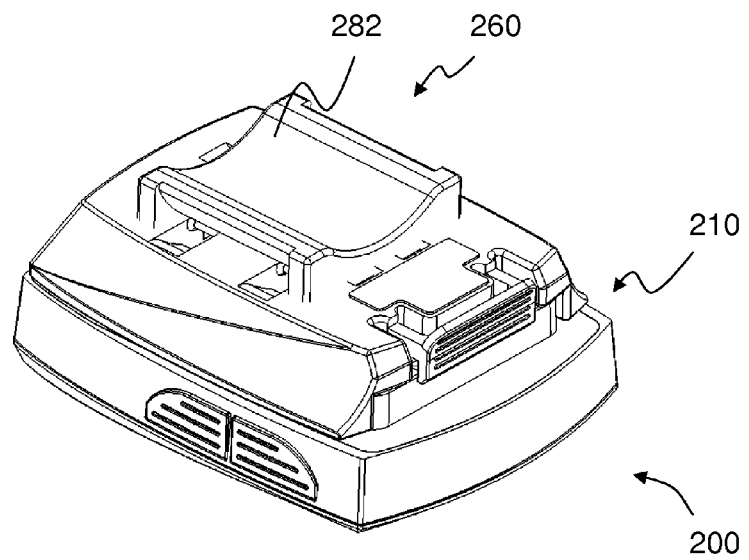
Figure 13:
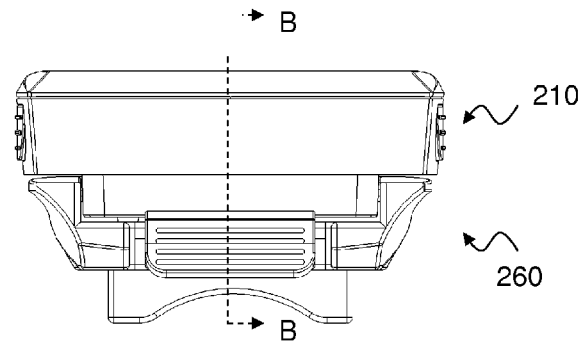
Figure 14:
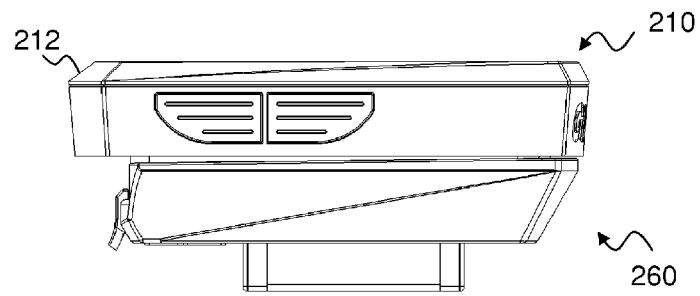
Figure 15:
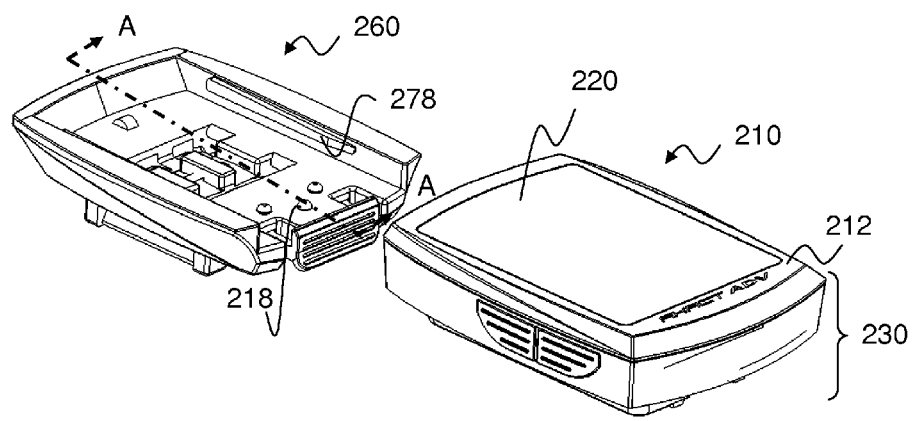
Figure 15A:
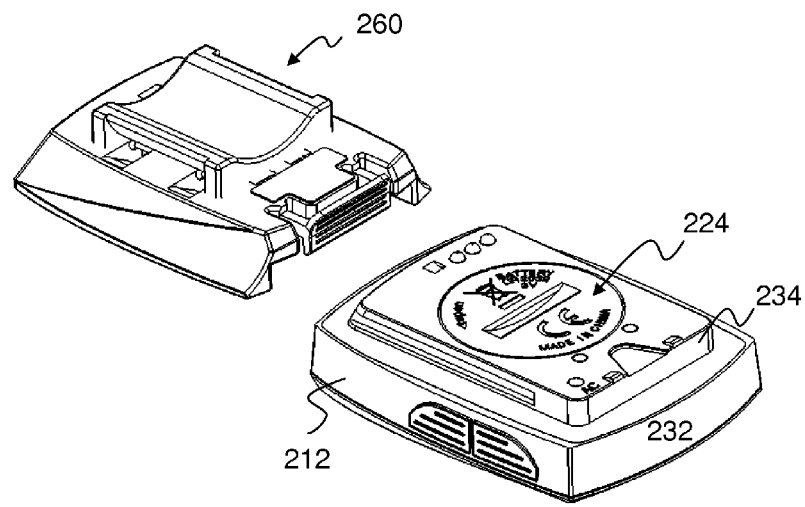
Figure 16:
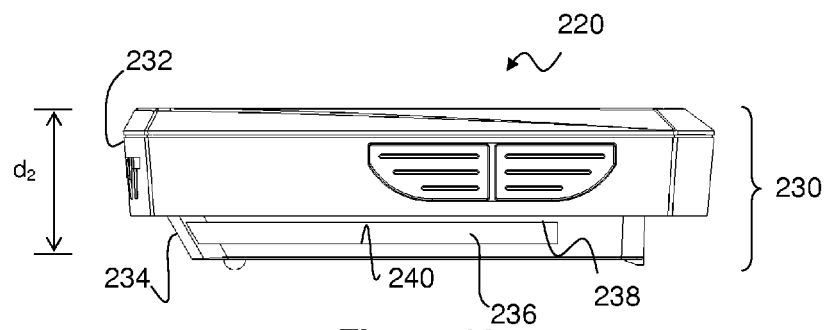
Figure 17:
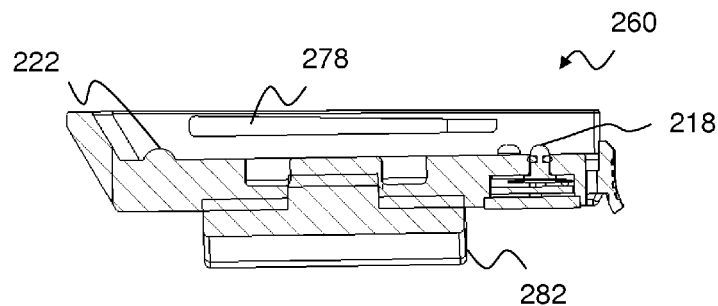
Figure 18:
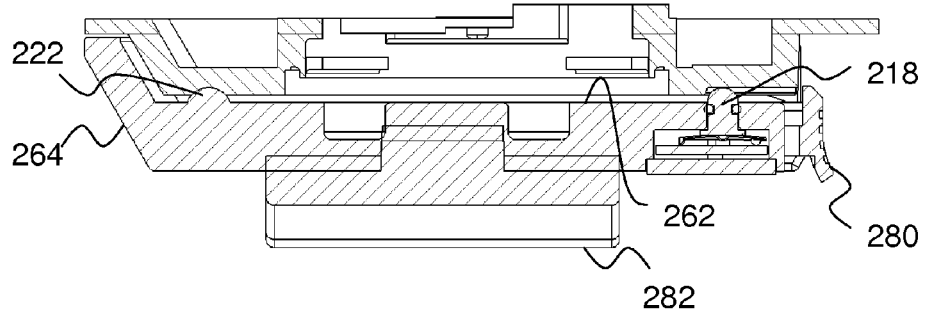
Figure 19:
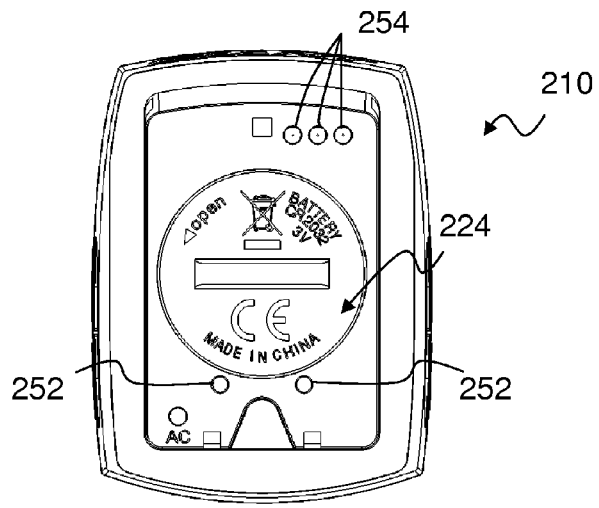
Figure 20:
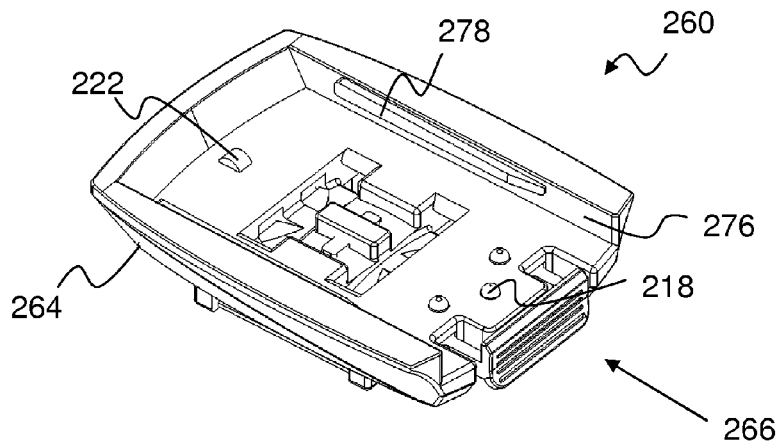

As shown in FIG. 6, the processor module is partly wedge-shaped and tapers towards the moveable end. More specifically, the depth (d1) (1.38 cm) of the processor module at the moveable end is lesser than that (d2) (1.46 cm) at the hinged end.

The aperture is located on a central longitudinal axis (axis B-B of FIG. 3) or the axis of symmetry of the housing at the pivotally moveable end. To achieve a good mechanical advantage and therefore a more efficient pivotal motion induced mechanical actuation, the switch actuation shaft on the moveable end of the housing is located most distal from the hinged end of the main housing. More particularly, the switch actuation shaft is located immediately underneath the edge of the LCD screen most distal from the hinged end.

The aperture surrounding recess 128 is formed as an indentation extending from an edge of the main housing which is most distal from the hinged end towards the hinged end. The recess 128 is arranged such that the actuation shaft of the switch does not protrude beyond the base portion of the processor module but could be actuated by the base receptacle by means of mechanically interaction to cause change of display when the processor module undergoes a pivotal motion cycle relative to the mounting base. The portion of the recess which intersects the edge of the main housing defines an entry indentation for slide-in entry of the local projection 168 on the mounting base.

The actuator shaft protrudes through the aperture on the bottom side of the main housing and is under spring bias so that the actuation shaft is always urged to return to its fully extended or non-actuation state when an actuation force is not present. The free end of the actuator shaft comprises a rounded metallic head, such as a steel head, which is arranged to urge against the mounting base to facilitate toggle or switch operation. The free end of the actuator shaft protrudes from the base of the recess but does not protrude beyond the bottom of main housing.

When this recess and actuation shaft arrangement cooperates with the mounting base having a corresponding shaped locally raised projection 168 or platform, the moveable end of the processor module will be elevated above the floor of the mounting base 160 and the elevation distance is sufficient to provide the operation displacement for the switch. On the other hand, this arrangement means that the processor module will lie flat on a leveled support surface when removed from the mounting base.

The peripheral portion 130 of the main housing includes an upper peripheral portion 132 which defines the window portion of the main housing and a lower peripheral portion 134 which defines the bottom surface and the battery compartment of the processor unit. The lower portion is retreated sideways from the upper portion such that a circumferential flange or shoulder portion is formed underneath the bottom surface of the top portion and surrounding the lower peripheral portion.

The lower peripheral portion 134 of the processor unit is adapted for detachable mounting on the mounting base and for facilitating pivotal movement of the processor module relative to the mounting base. To facilitate detachable mounting between the processor module and the mounting base, guiding means are provided on the two outer lateral sides of the lower peripheral portion of the processor module. The guiding means are arranged such that the processor module can slide into and out of mounted engagement with the mounting base by moving in an axial direction along a cooperative guiding means formed on the mounting base. The lateral sides are both parallel to the axial direction to facilitate slide-in engagement and slide-out disengagement.

Figure 5:
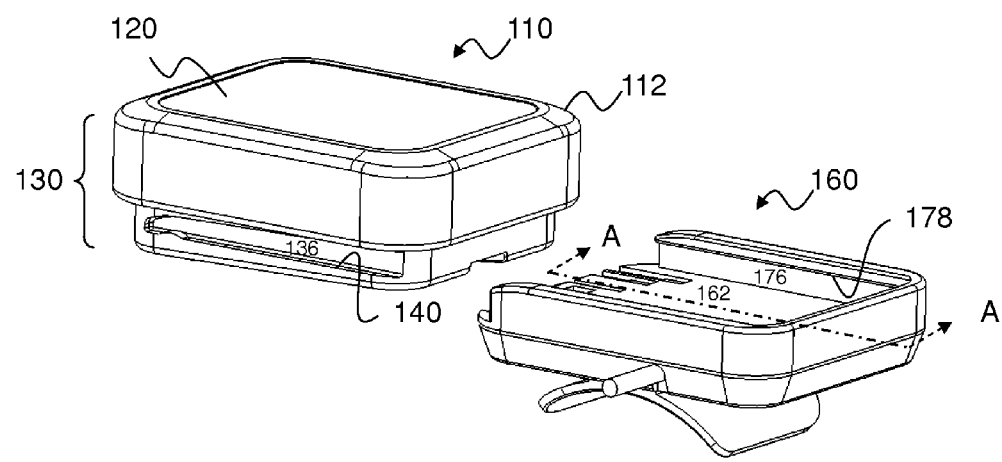
Figure 5A:
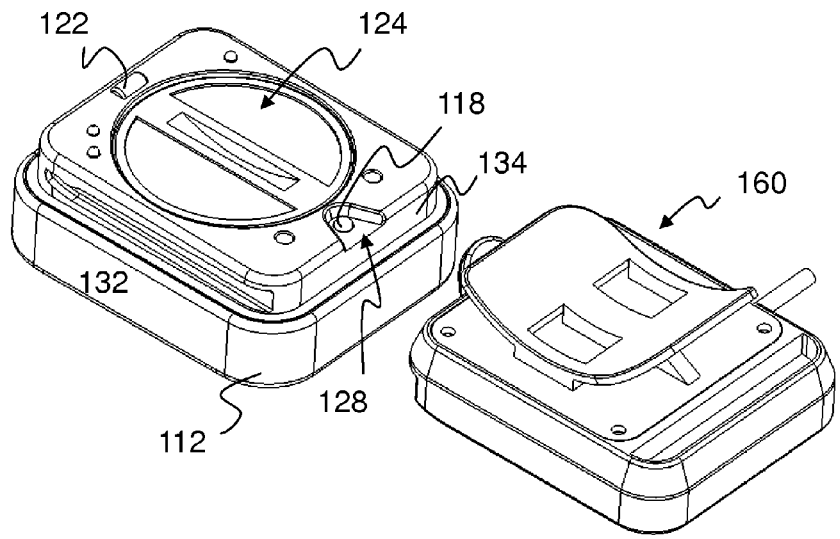

As shown more particularly in FIGS. 5 and 6, each guiding means on the processor module comprises a track-and-rail arrangement. The track 136 is a channel or groove defined between an upper rail 138 and a lower rail 140. The track extends substantially along the entire length of the lower peripheral portion until the upper 138 and lower 140 rails merged to define a narrowed aperture for receiving a blade edged fulcrum. The track 136 includes an open end which defines an open end aperture and a closed end. The open end is adapted for guided slide entry of the processor module into the mounting base to be explained below, and the lower rail 140 at the open end is adapted to limit the maximum allowable pivotal movement amplitude of the processor module relative to the base receptacle to be explained below in more detail.

The track 136 tapers towards the closed end and the portion of the track proximal the closed end deflects towards the base receptacle. In other words, the portion of the track 136 proximal the tapered closed end is deflected or at an elevation angle to the portion of the track proximal the open end. The angled elevation of the portion of the track proximal the closed end is adapted to cooperate with a complementarily shaped rail end on the mounting base to define an end of a hinged axle.

The lower rail 140 slopes upwardly as it traverses from the open end of the track towards the closed end. In other words, the lower rail 140 slopes upward as it traverses from the moveable end of the processor module towards the hinged end. It is noted that the total elevation of the lower rail 140 is substantially the same as the elevation caused by the raised projection 168 so that the display screen is substantially leveled and parallel with the floor 162 of the mounting base 160. The levelling of the display screen is facilitated by elevation of the wedged end of the processor by the projection 168 which compensates the difference in depth at the longitudinal ends of the processor module.

The mounting base 160 comprises a receptacle for detachably receiving the processor module, and an anchoring arrangement 182 underneath the receptacle for anchoring the device on a support. The receptacle comprises a leveled floor 162 and an upstanding peripheral wall 164 which surrounds the floor while leaving an entry aperture 166 at the front portion of the floor to permit entry of the processor module. As shown more particularly in FIGS. 5, 7 and 10, the peripheral wall comprises first and second lateral wall portions and a rear wall portion joining the first and second lateral wall portions. The first and second lateral wall portions are parallel and spaced apart and are arranged to receive the lower peripheral portion 134 of the processor module in a closely fitted manner. Each of the first and second lateral wall portions comprises a guiding means for guiding the processor module to enter into the receptacle and to reach a mounted position.

Similar to that of the processor module, each guiding means of the first and second lateral walls comprises a track-and-rail arrangement. The track 176 is a channel or groove defined between an upper rail 178 and the floor 162. The track extends substantially along the entire length of the receptacle. The track 176 includes an open end which defines an open end aperture and a closed end proximal the rear wall. The open end of the track is adapted for guiding slide entry of the processor module into the mounting base to be explained below. More specifically, the track on the first and second lateral walls are adapted to receive or cooperate with the lower rails of the processor module, while the upper rails 178 of the first and second lateral walls are adapted to cooperate with the tracks 136 of the processor module. The cooperative engagement between the tracks and rails of the processor module and the mounting unit provides useful interlocking against non-axial movement between the two modular components, as well as forming an efficient fulcrum arrangement to be detailed below.

The end of the upper rail 178 most distal from the entry aperture 166 is adapted to cooperate with the lower rail 140 of the processor module to limit the maximum allowable pivotal movement amplitude of the processor module relative to the floor of the base receptacle.

The upper rail 178 gradually tapers towards the entry aperture to form a blade edged fulcrum when in cooperation with the tapered end of the track 136. Similar to the track 136, the portion of the rail 178 proximal the entry aperture 166 is deflected, and the deflection is curved towards the floor 162.

A local projection 168 complementary to the shape of the recess 128 of the processor module is formed at a longitudinal end of the floor distal from the entry aperture 166. The local projection 168 is arranged to elevate the moveable end of the processor module above the floor to facilitate pivotal actuation motion and is always in contact with the actuation shaft of the switch 118. The projection 168 and the recess 128 are complementarily shaped such that when the moveable end of the processor module pivots towards the floor 162, the project 168 is received within the recess 128 and would not block relative pivotal movement. In effect, the height of the projection 168 above the floor defines the maximum allowable amplitude of relative pivotal movement between the processor module and the base receptacle.

To prevent accidental slipping off of the display unit from the receptacle base, a latching indentation is formed at a location corresponding to that of the latching tooth 122 on the display unit. The latching indentation is defined between a finger operable tab 180 and the floor, and the latching is releasable by operating the finger tab 180, for example, by pushing the tab 180 towards the moveable end of the display unit.

To facilitate detachable mounting of the processor module onto the mounting base, the display unit is slide into and out of the base receptacle by means of the cooperative guiding means.

When the display unit 110 has been moved into the mounted position of FIG. 1 after undergoing relative axial sliding movement relative to the base receptacle 160 along the cooperative guiding means and latched by the corresponding latching means, formed by the latching tooth and the corresponding latching indentation, the deflected and tapered rail end portion of the upper rail 178 of the base receptacle is received by the correspondingly deflected and tapered closed end of the track 136 on the display unit 110.

The mating of the tapered rail end portion of the upper rail 178 with the tapered closed end of the track 136 collectively forms a blade edged hinge axis. In addition, the direction of deflection of the tapered track portion is aligned with the elevation of the moveable end with respect to the hinged end of the display unit such that the hinge axis is under minimal stress during the rest state or non-actuated state when the moveable end is fully elevated.

In use, the performance display device is mounted on a support surface, switched on and set to a preferred operation mode. The mode of display is toggled when a user press or depress the display unit 110 towards the floor of the base receptacle, thereby depressing the actuation shaft and actuating the display mode change switch. When the actuation is removed, the spring urge on the actuation shaft will return the actuation shaft to the fully extended state to await another actuation.

In a modified version of the above embodiment, the device is substantially identical to that of FIGS. 1 to 10, except that the actuation switch is mounted on the base receptacle and protrudes upwards towards the display unit, and the local projection may be formed on the bottom of the display unit and with the corresponding shaped actuation shaft surrounding aperture formed on the floor of the base receptacle.

FIGS. 11-20 show a second embodiment of a performance display device 200 which is substantially identical to that of FIGS. 1 to 10, except that the actuation switch 218 is mounted on the base receptacle and protrudes upwards towards the display unit plus other modifications which are apparent from the Figures. As parts of device 200 and their interrelationship are substantially identical to that of the embodiment of FIGS. 1 to 10, description on the parts of FIGS. 1 to 10 and their inter-relations are incorporated herein by reference with the numerals increased by 100 without loss of generality.

As shown in FIGS. 11 to 20, a track 236 of substantially uniform track width throughout is formed on the lower peripheral portion of the display unit, and a correspondingly shaped rail 278 is formed on a lateral peripheral wall on the base receptacle. A tooth or a rounded stub head 222 is formed at the hinged end of the display unit to form a round edged pivotal axis. This rounded stud elevates the hinged end of the display unit above the floor of the base receptacle to facilitate pivotal actuation motion. The actuator shaft of switch 218 protrudes from the floor of the base receptacle and there is a corresponding shaped recess on the bottom of the display unit 210 to cooperate with the actuator shaft. As the display unit is elevated by both the round headed stud 222 and the actuator shaft, depression of the moveable end of the display unit will depress the actuator shaft, thereby operating the switch 218. Also, the rounded stud and the actuator shaft are disposed along a longitudinal axis on the centre of the base receptacle.

Figure 21:
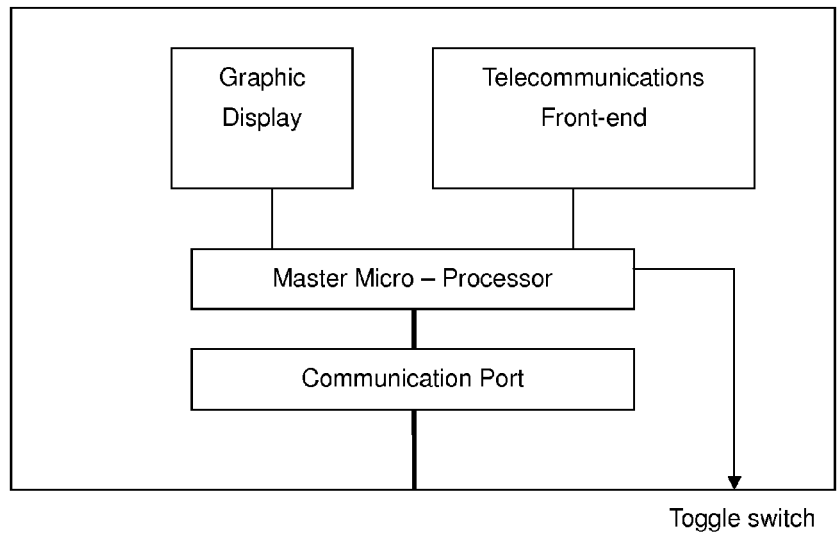
FIG. 21 is a schematic block diagram showing a basic configuration of the sports computers of FIGS. 1-20.
Figure 22:
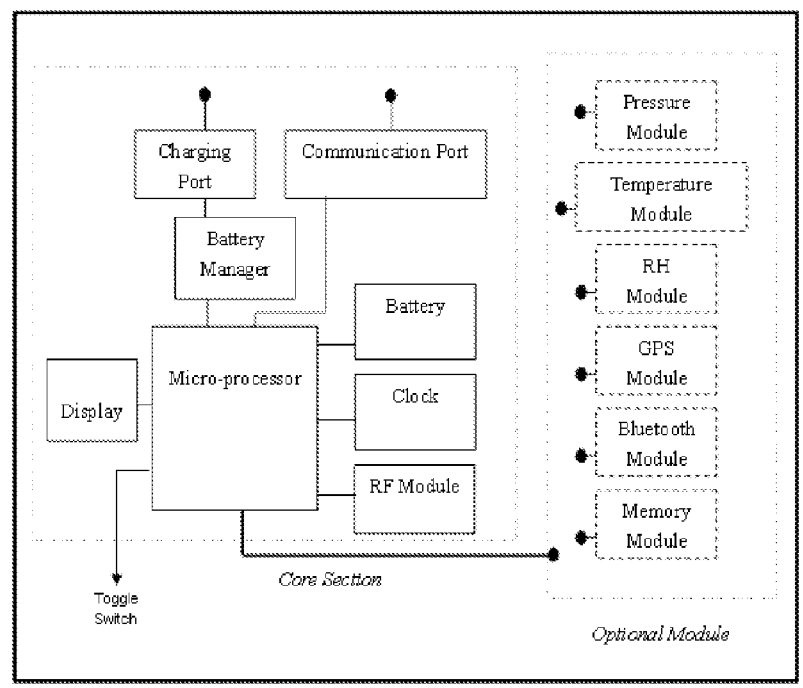
FIG. 22 is a schematic block diagram showing another configuration embodiment of the sports computers of FIGS. 1-20.

Turning to FIGS. 21 and 22 are in which schematic block diagrams of the bicycle computer. A microprocessor (also known as a microcontroller, or processor in short) is housed within the main housing and is connected to various sensors or monitors for capturing desirable performance data such as speed, cadence, distance, blood; physical data such as wind speed, air pressure, relative humidity, direction, slope inclination, positioning data or GPS data; or physiological data such as ECG signals, blood pressure, blood sugar, blood oxygen level, body temperature etc. The processor may also connect to communication interfaces so that data communications could take place between the sports computer and an external device. The data communications could be by wire or wireless means such as Bluetooth or other public data communications systems. The processor is connected to a toggle switch as an example of a switch 118 and the display and/or operation modes of the processor can be toggled by operation of the toggle switch through relative pivotal motion as explained.

Figure 23:
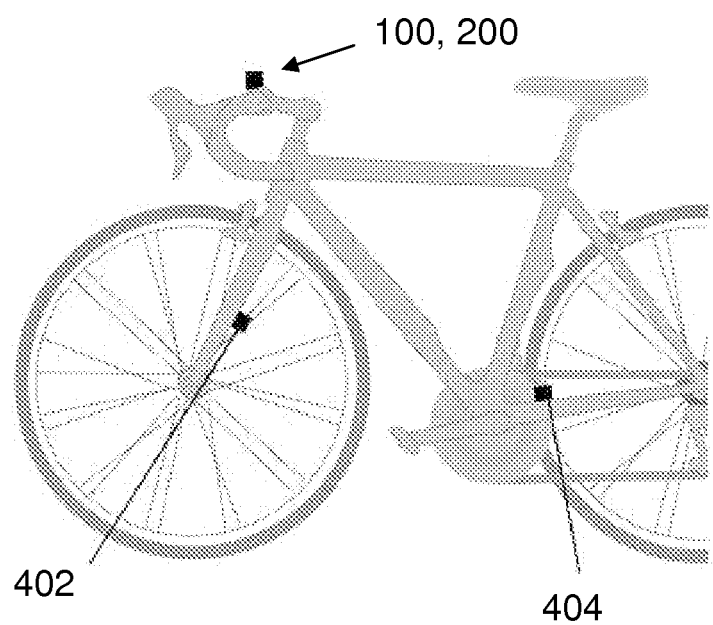
FIG. 23 illustrates an application of the bicycle computers of FIGS. 1-20.

An exemplary operation of the bicycle computer will be explained with reference also to FIG. 23, in which the bicycle computer 100, 200 is mounted on the front portion of a bicycle with wireless communication means connecting the microprocessor to a speed sensor 402 and a cadence sensor 404. The bicycle computer is mounted in front of the user with the information display screen facing the user. When the user wishes to toggle the display screen, the user can press the lower longitudinal edge of the main unit and such a press will bring about pivotal movement of the main unit about the pivotal hinge, more particularly the edge fulcrum. As a result of this pivotal movement, the actuator is depressed and the toggle switch actuated. Such an actuation of the toggle switch transmits a control signal to the processor which then changes the display format and information accordance with predetermined rules.

While the invention has been explained with reference to a bicycle computer as an example, it will be appreciated by persons skilled in the art that the example is not limiting and the same and similar constructions can be applied to other sports computers without loss of generality. For example, while the main unit is detachably mounted, it will be appreciated that the main unit and the mounting base may not be detachable. Furthermore, while the bicycle computer described herein is a miniature cookie-sized bicycle computer with a display area of the screen measuring less than 2.3 cm×2.5 cm (width (W)×length (L)) and the main housing measuring less that 3.4 cm×4 cm (width (W)×length (L)), the construction can be applied to sports computer or performance display devices of other dimensions without loss of generality.

| | | Table of Numerals |
|---|---|---|
| 100 | 200 | Bicycle computer |
| 110 | 210 | Processor module |
| 112 | 212 | Main housing |
| 114 | 214 | Liquid crystal display (LCD) screen |
| 116 | 216 | Microcontroller |
| 118 | 218 | Actuation switch |
| 120 | 220 | Transparent screen |
| 122 | 222 | Tooth |
| 124 | 224 | Battery compartment |
| 128 | 228 | Recess |
| 130 | 230 | Peripheral portion |
| 132 | 232 | Upper peripheral portion |
| 134 | 234 | Lower peripheral portion |
| 136 | 236 | Track |
| 138 | 238 | Upper rail |
| 140 | 240 | Lower rail |
| 152 | 252 | Contact switch |
| 154 | 254 | Data entry |
| 160 | 260 | Mounting base |
| 162 | 262 | Floor |
| 164 | 264 | Peripheral wall |
| 166 | 266 | Entry aperture |
| 168 | 268 | Projection |
| 176 | 276 | Track |
| 178 | 278 | Upper rail |
| 180 | 280 | Operable tab |
| 182 | 282 | Anchoring arrangement |
| 402 | | Speed sensor |
| 404 | | Cadence sensor |

The invention claimed is:

1. A performance display device comprising a base receptacle and a display unit;
    wherein the display unit comprises a display screen and a processor, and is operable by a mode switch: wherein the processor is arranged to process performance data, to cause showing of information on the display screen with a plurality of modes, and to change the plurality of modes type of information to be displayed when the mode switch is operated; wherein the mode switch is operated by a relative pivotal motion between the display unit and the base receptacle; and wherein the display unit and the base receptacle are complementarily shaped to cooperatively tapered toward form a hinge axis about which the mode changing pivotal motion takes place; and the display unit is elevated by a rounded stub head forming the hinge axis which located on a distal end of the base receptacle and an actuation shaft forming a moveable end which located on an opposite distal end of the base receptacle along a central axis of the base receptacle; wherein depression of the moveable end cause depressing the actuation shaft and thereby operating the mode switch.

2. A performance display device according to claim 1, wherein the base receptacle and the display unit are shaped to cooperatively define a track and rail arrangement, and wherein the track and rail arrangement defines a track to provide clearance to facilitate the relative pivotal motion between the display unit and the base receptacle about the hinge axis.

3. A performance display device according to claim 1, wherein the base receptacle and the display unit are shaped to cooperatively define a track and rail arrangement, and the track and rail arrangement defines the maximum allowable amplitude of the relative pivotal motion between the display unit and the base receptacle about the hinge axis.

4. A performance display device according to claim 1, wherein the base receptacle and the display unit are shaped to cooperatively define a track and rail arrangement, the track and rail arrangement comprising at least a track and a rail, and wherein the track and the rail taper towards a first longitudinal end to cooperatively define the hinge axis and the track flares towards a second longitudinal end distal from the first longitudinal end to define the maximum allowable amplitude of the relative pivotal motion between the display unit and the base receptacle about the hinge axis.

5. A performance display device according to claim 1, wherein the base receptacle and the display unit are shaped to cooperatively define a track and rail arrangement, the track and rail arrangement extending in a longitudinal direction and the length of the track and rail arrangement in the longitudinal direction is comparable to the length of the display unit about the hinge axis.

6. A performance display device according to claim 1, wherein the base receptacle and the display unit are shaped to cooperatively define a track and rail arrangement, the track and rail arrangement defining a track on the display unit and a rail on the receptacle; and wherein the track defines an access aperture to allow the rail to access and a closed end to define the hinge axis cooperatively with a longitudinal end of the rail.

7. A performance display device according to claim 1, wherein the display unit is detachably mounted on the base receptacle, and each of the base receptacle and the display unit comprises a guide arrangement; wherein the guide arrangements on the base receptacle and on the display unit are to cooperate with other to facilitate guided detachment of the display unit from the base receptacle along a longitudinal axis, the longitudinal axis being orthogonal or substantially orthogonal to the hinge axis; and wherein the guide arrangements cooperate to define the hinge axis and provide clearance to facilitate the relative pivotal motion between the display unit and the base receptacle.

8. A performance display device according to claim 7, wherein each of the guide arrangements comprises a track and rail arrangement, the track and rail arrangement on the base receptacle and that on the display unit being complementarily shaped.

9. A performance display device according to claim 7, wherein each of the guide arrangements comprises a track and rail arrangement, the track and rail arrangement comprising a rail having a blade-shaped end and a track having a complementarily shaped track end to mate with the blade-shaped end of the rail to form a blade edged hinge.

10. A performance display device according to claim 7, wherein each of the guide arrangements comprises a track and rail arrangement, the track and rail arrangement comprising a track which is formed as an elongate groove on a longitudinal side of a main body of the display unit.

11. A performance display device according to claim 8, wherein the track extends substantially along the entire length of the main body of the display unit.

12. A performance display device according to claim 7, wherein the track is defined between an upper rail and a lower rail on the main body.

13. A performance display device according to claim 1, wherein the display unit includes a hinged end and a moveable end, the moveable end being pivotally moveable about the hinge axis at a hinged end of the display unit; and wherein the switch is disposed to elevate the moveable end of the display unit above the base receptacle to allow pivotal motion of the moveable end of the display unit about the hinge axis.

14. A performance display device according to claim 13, wherein the switch is a push button switch having the actuation shaft, the actuation shaft being moveable between an extended state and a retracted state to change the switching status and being under spring urge to return to the extended state; and wherein the moveable end of the display unit is elevated above the base receptacle by the actuation shaft, and wherein and the switch is arranged to send a switching signal to the processor to cause a change in display or operation mode when the actuation shaft is actuated.

15. A performance display device according to claim 13, wherein the switch is mounted on the base receptacle with the actuation shaft protruding towards the display unit.

16. A performance display device according to claim 13, wherein the base receptacle and the display unit are shaped to cooperatively define a track and rail arrangement, the track and rail arrangement comprising a rail having a deflected longitudinal end portion and a track having a correspondingly shaped longitudinal end portion to elevate the moveable end of the display unit.

17. A performance display device according to claim 1, wherein the display unit comprises a main housing on which the processor and the display screen are mounted, and the base receptacle comprises a floor and an upstanding peripheral wall extending from the floor; and wherein the display unit and the base receptacle are cooperatively latched against relative axial detaching movement until an axial detaching force exceeding a predetermined threshold is applied, and wherein the main housing including a plastic frame surrounding the display screen, and the footprint of the plastic frame overlaps or substantially overlaps with the upstanding peripheral wall.

18. A performance display device according to claim 1, wherein the device is a bicycle computer.

19. A bicycle computer according to claim 18, wherein the base receptacle includes a securing arrangement for securing the base receptacle to the bicycle.

* * * * *